United States Patent [19]

Jennings et al.

[11] Patent Number: 5,402,512
[45] Date of Patent: Mar. 28, 1995

[54] FIBER OPTIC STAR AND TRANSMISSION ASSEMBLY

[75] Inventors: Kurt L. Jennings, Warren; Robert E. Steele, Cortland, both of Ohio; Gregory D. Miller, Stanford, Calif.

[73] Assignee: General Motors Corporation, Detroit, Mich.

[21] Appl. No.: 260,292

[22] Filed: Jun. 14, 1994

Related U.S. Application Data

[62] Division of Ser. No. 91,940, Jul. 15, 1993, Pat. No. 5,367,595.

[51] Int. Cl.⁶ .............................................. G02B 6/36
[52] U.S. Cl. .................................... 385/46; 385/59; 385/65; 385/83; 385/114
[58] Field of Search ................. 385/46, 39, 59, 63, 385/65, 83, 84, 89, 92, 114

[56] References Cited

U.S. PATENT DOCUMENTS

| | | | |
|---|---|---|---|
| 4,046,454 | 9/1977 | Pugh, III | 385/65 X |
| 4,079,927 | 3/1978 | Rolton | 385/65 X |
| 4,252,407 | 2/1981 | Bubanko et al. | 385/59 |
| 4,943,136 | 7/1990 | Popoff | 385/46 |
| 4,995,692 | 2/1991 | Diliello et al. | 385/46 |
| 5,151,964 | 9/1992 | Carpenter et al. | 385/65 X |
| 5,259,050 | 11/1993 | Yamakawa et al. | 385/114 X |

*Primary Examiner*—Rodney B. Bovernick
*Assistant Examiner*—Hemang Sanghavi
*Attorney, Agent, or Firm*—William A. Schuetz

[57] ABSTRACT

A fiber optic star and transmission assembly for transmitting optical signals from a plurality of input optic fibers to a plurality of output optic fibers. The assembly comprising a female connector body retaining and positioning a plurality of input and output optic fibers, a convergence connector body having a pair of central cavities with a semi-circular grooves, and wedge means having semi-circular recesses which is inserted in to the cavities to define passageways. The optic fibers are inserted through the passageways which guide the jacketed and stripped ends of the optic fibers into a linear slot at the forward end of the convergence connector. The female connector is slidably connected to the convergence connector. A ribbon retainer housing and a hollow cover means complete the star assembly.

3 Claims, 8 Drawing Sheets

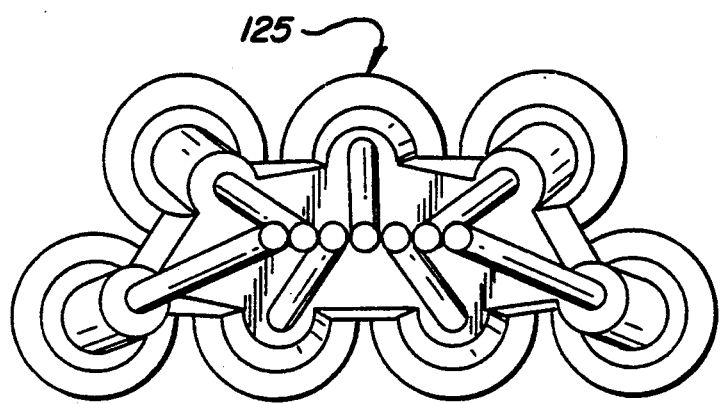
FIG-7
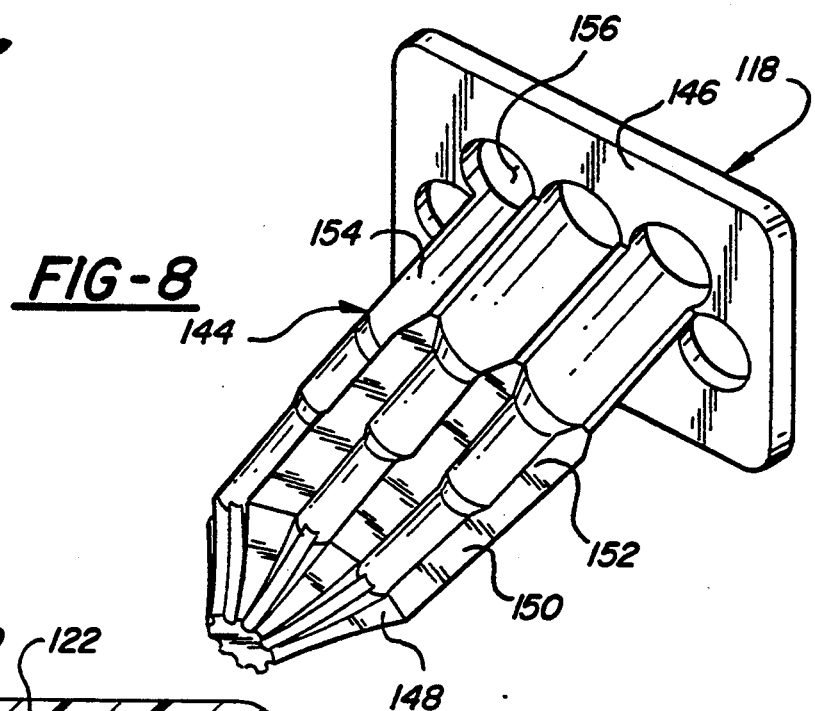
FIG-8
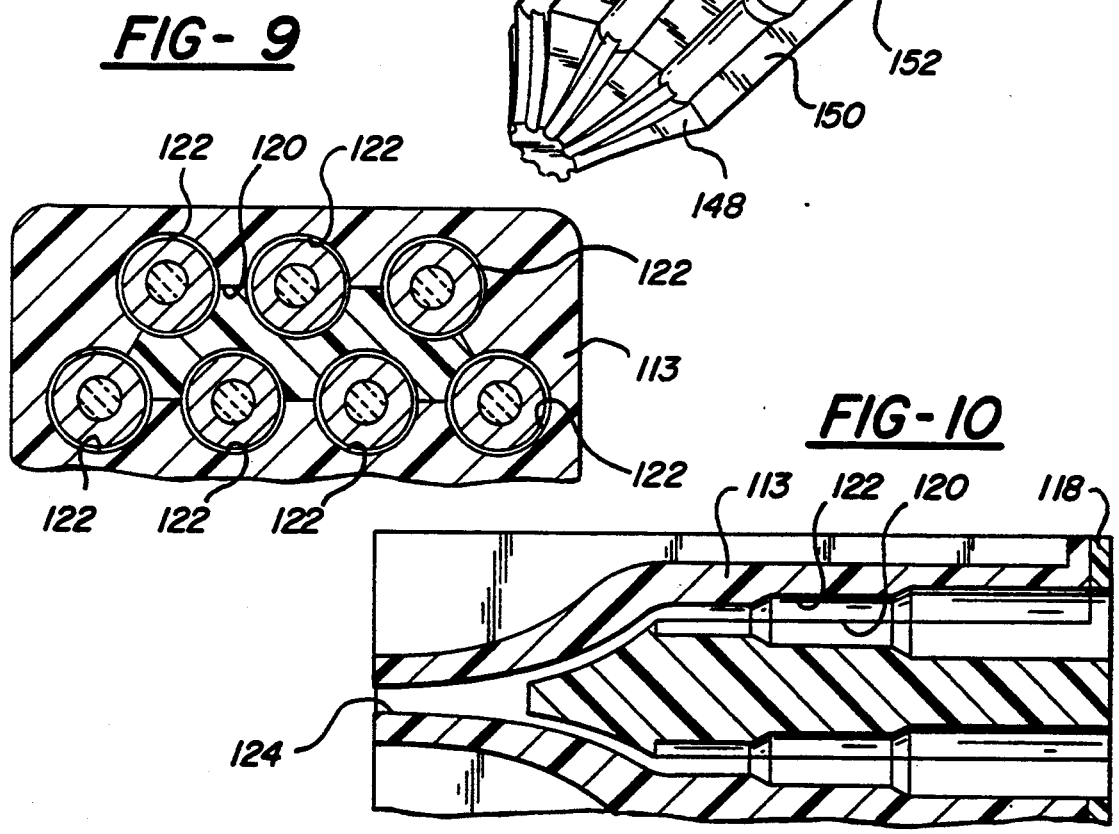
FIG-9
FIG-10

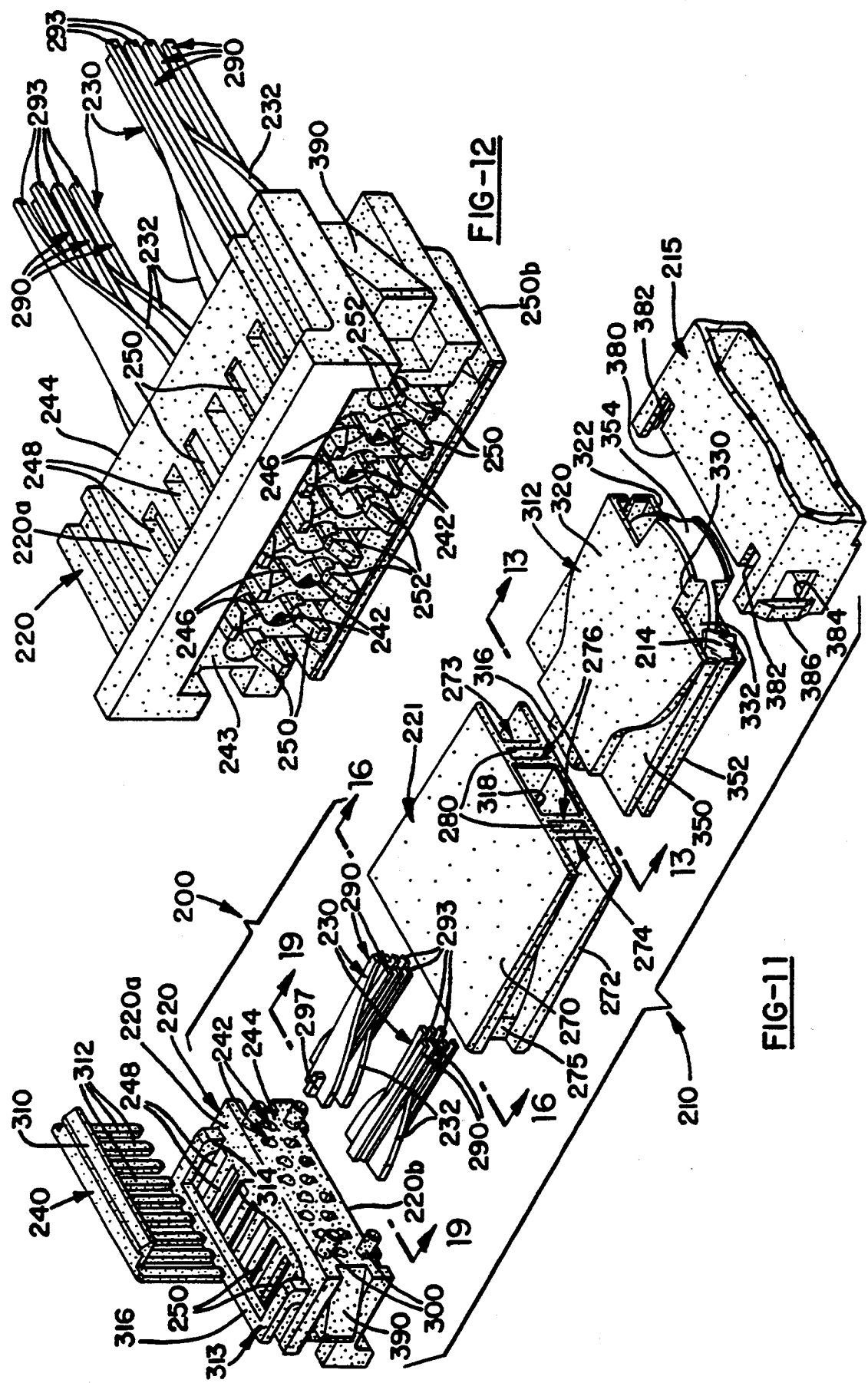

FIBER OPTIC STAR AND TRANSMISSION ASSEMBLY

This is a division of application Ser. No. 08/091940, filed on 15 Jul. 1993, now U.S. Pat. No. 5,367,595.

BACKGROUND OF THE INVENTION

This invention relates generally to fiber optic connectors and more particularly to a fiber optic connector for connecting a fiber optic wiring harness to an optical device such as a star coupler.

U.S. Pat. No. 4,995,692 granted to Laura K. DiLiello, Gregory D. Miller and Robert E. Steele Feb. 26, 1991 discloses a fiber optic connector 38 for a star coupler. The star coupler comprises a flexible optical ribbon 48 that is curved so that input and output bundles or harnesses 18, 20 of individually jacketed optic fibers 24 connect to the same side of the coupler by means of the fiber optic connector 38.

The fiber optic connector 38 is difficult and expensive to attach to the optic fibers 24. One part of the connector 38 comprises a multi-apertured block 22 that receives each individual jacketed optic fiber 24 and secures it in an orderly pattern. The jackets 26 are then removed from the ends of the optic fibers that protrude from the block 22. The stripped ends 28 are then held in a pair of parallel abutting linear arrays by a second block or fiber holder 30 that has two lines of holes 32 that snugly receive the stripped ends 28. The stripped ends are then cut off flush with the face of the fiber holder 30 and polished. The fiber holder 30 has a pin 34 and aperture 36.

The other part of the connector 38 comprises a ribbon holder 40 having a pair of parallel slots 42 that receive the ends 50 of the flexible curved optical ribbon 48. The ribbon holder 40 has a pin 44 and aperture 46 that are a mirror image of the pin 34 and aperture 36 of the fiber holder 30. The ribbon ends 50 and the fiber ends 28 engage in a precise alignment when the connector parts are joined by plugging the fiber holder 30 and ribbon holder 40 together.

SUMMARY OF THE INVENTION

The object of this invention is to provide an improved fiber optic connector for joining a bundle of jacketed optic fibers to an optical device that requires a linear array or arrays of stripped optic fibers at the connection interface.

A feature of the fiber optic connector of this invention is that the connector allows independent assembly, service and replacement of each optic fiber.

Another feature of the fiber optic connector of this invention is that the connector has converging grooves for holding the optic fibers to provide a linear array of optic fibers at the front end while providing adequate space for handling the optic fibers individually at the rear end.

Another feature of the fiber optic connector of this invention is that the connector has individual springs biasing each optic fiber to assure flush contact of all fiber end faces with a flat contact surface of the optical device.

Still another feature of the fiber optic connector of this invention is that the connector has converging grooves for holding the optic fibers that are non-linearly arrayed to reduce package size while providing adequate space to handle the optic fibers individually at the rear end of the connector.

Still yet another feature of the fiber optic connector of this invention is that the connector has a wedge member to ensure guidance of the individual optic fibers through their individual grooves and into a common slot at the front end of the connector.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 7 is a front view of the mold insert that is shown in FIG. 6;

FIG. 8 is a perspective view of another component of the second embodiment of the fiber optic connector that is shown in FIG. 5;

FIG. 9 is a section taken substantially along the line 9—9 of FIG. 5 looking in the direction of the arrows; and FIG. 10 is a section taken substantially along the line 10—10 of FIG. 5 looking in the direction of the arrows.

FIG. 11 is an exploded perspective view of a fiber optic star and transmission line assembly;

FIG. 12 is a perspective view of part of a third embodiment of a fiber optic connector or connector means made in accordance with the present invention;

DESCRIPTION OF THE INVENTION

Figure 1:
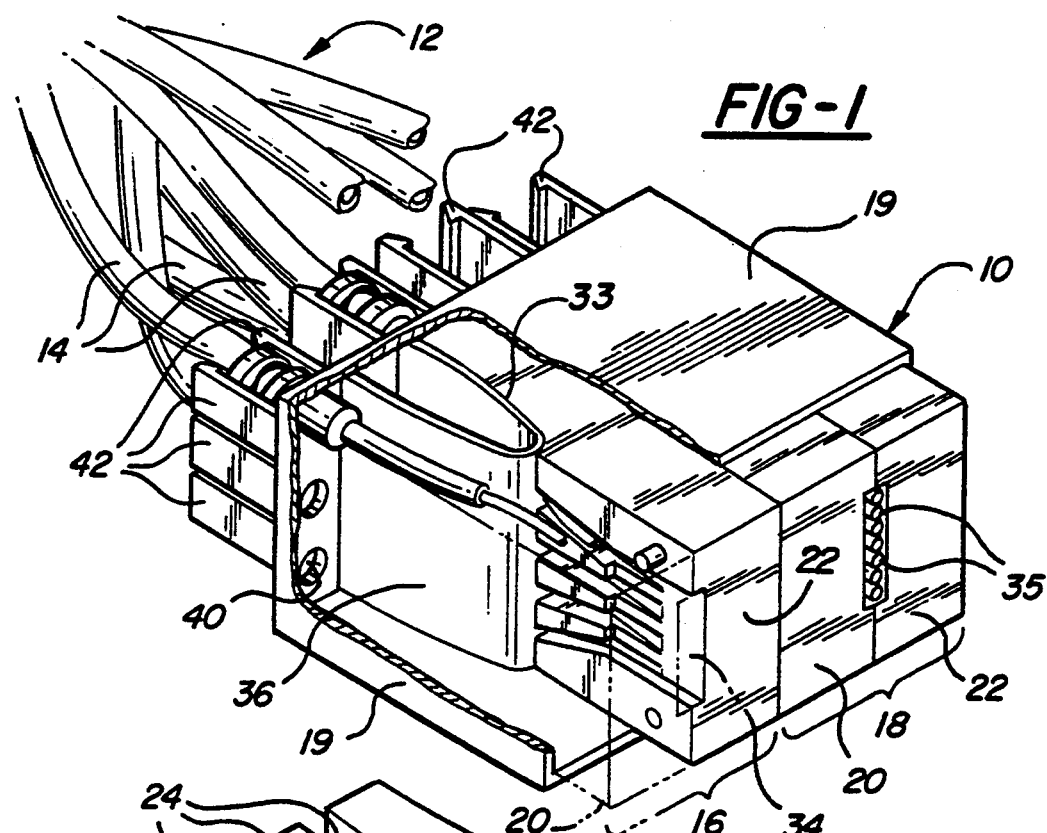
FIG. 1 is a perspective view of a first embodiment of a fiber optic connector in accordance with the invention.

Referring now to the drawing, FIG. 1 shows a fiber optic connector 10 for connecting a fiber optic harness 12 having a plurality of jacketed optic fibers 14 to an optical device such as a star coupler that is disclosed in U.S. Pat. No. 4,995,692 that is discussed above. This optical device has a flat rectangular contact surface at each end of the ribbon for engaging a linear array of optic fiber end faces.

Figure 2:
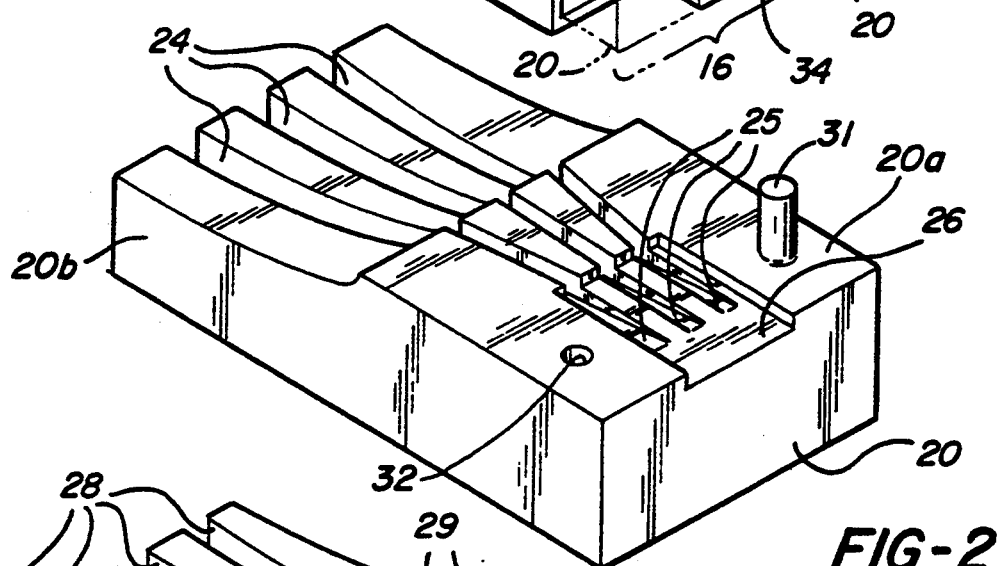
FIG. 2 is a perspective view of a component of the fiber optic connector that is shown in FIG. 1.
Figure 3:
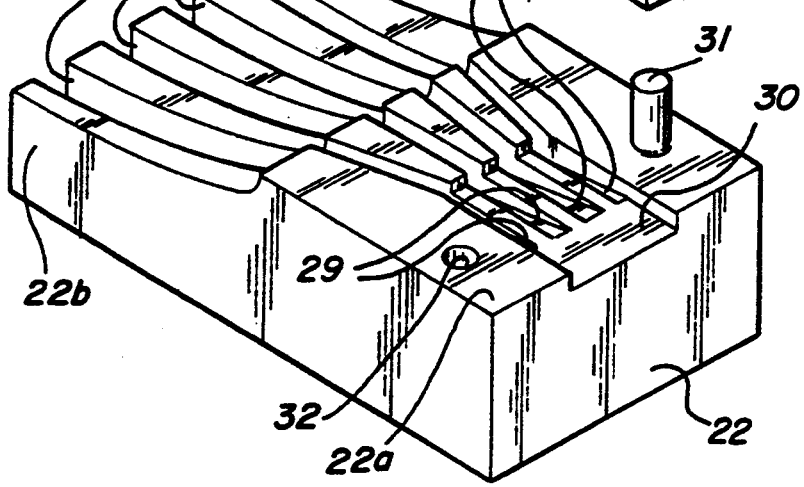
FIG. 3 is a perspective view of another component of the fiber optic connector that is shown in FIG. 1.

The fiber optic connector 10 of this invention combines side-by-side input and output connectors 16 and 18 in a common shell 19. The input connector 16 has a two piece outer member consisting of parts 20 and 22 that are shown in FIGS. 2 and 3 respectively.

Part 20 has a block shaped front portion 20a and a tapered rear portion 20b. The tapered rear portion 20b has three grooves 24 that continue into the front block portion 20a and eventually communicate with a partial slot 26 at the front end of part 20. The rear portions of the grooves 24 that are in the tapered rear portion 20b of part 20 are large enough to accommodate the jacketed optic fibers 14 while the transition portions in the rear of the front block portion 20a are only large enough to accommodate the stripped cores of the optic fibers. The transition portions of the grooves 24 emerge as individual ramps 25 in the rear portion of the partial slot 26 that end at the front portion of the partial slot 26. The front portion of the partial slot 26 at the front end of part 20 has a constant depth that is substantially equal to the radius of the stripped core of the optic fibers 14.

Part 22 is similar. It also has a block shaped front portion 22a and a tapered rear portion 22b. But it has four grooves 28 in the tapered rear portion 22b that continue into the front block portion 22a and eventually communicate with a partial slot 30 at the front end of part 22. The rear portions of the grooves 28 that are in the tapered rear portion 22b of part 22 are also large enough to accommodate the jacketed optic fibers 14 while the transition portions in the rear portion of the front block portion 22a will only accommodate the stripped cores of the optic fibers 14. These transition portions of the grooves 28 also emerge as individual ramps 29 in the rear portion of the partial slot 30 that end at the front portion of the partial slot 30. The front portion of the partial slot 30 at the front end of part 22 also has a constant depth that is substantially equal to the radius of the stripped core of the optic fibers 14.

Parts 20 and 22 are plugged together face-to-face by means of complimentary posts 31 and holes 32 in each part 20, 22 to provide the two piece outer member of the input connector 16 as shown in FIG. 1. When parts 20 and 22 are plugged together, a cavity 33 is formed in the rear end of the outer member by the tapered rear portions 20b, 22b of parts 20 and 22 and a full slot 34 having a constant depth substantially equal to the diameter of the stripped cores of the optic fibers 14 is formed at the front end by the partial slots 26 and 30. The grooves 24 and 28 are arranged in two rows that at start are on opposite sides of the cavity 33 and then converge into the slot 34 at the front end. The grooves 24 are offset from the grooves 28 in the lateral direction so that the stripped cores of the optic fibers 14 disposed in the grooves 24 and 28 merge into the slot 34 in an interdigitated relationship to form an abutting linear array of stripped core ends 35, that is substantially flush with the face of the input connector 16.

The input connector 16 further comprises an inner wedge member 36 that fits into the cavity 33 at the rear end of the input connector 16 that is formed by the tapered rear portions 20b, 22b of parts 20 and 22, respectively. The inner wedge member 36 guides and holds individual jacketed optic fibers 14 in the respective rear portions of the grooves 24 and 28. The front or nose end of the inner wedge member 36 is located at the back of the front block portions 20a, 22a of the parts 20 and 22 where the stripped core ends 35 of the optic fibers 14 enter the transition portions of the grooves 24 and 28.

The inner wedge member 36 is attached to the shell 19 encasing the two-piece outer member of the input connector 16. The back wall of the shell 19 has a plurality of apertures 40 that are aligned with the respective grooves 24 and 28. The shell 19 also includes a pair of resilient latch fingers 42 associated with each aperture 40 that are integrally attached to the back wall of the shell 19 in cantilever fashion. The latch fingers 42 retain the optic fibers 14 in the input connector 16 individually so that each optic fiber 14 is assembled independently and can be serviced or replaced without disturbing the others.

The output connector 18 is identical to the input connector 16 consisting of two identical grooved parts 20 and 22 that are plugged together to form a cavity 33 at the back end and a full slot 30 at the front end. The output connector 18 also includes an identical inner wedge member 36 that is also a part of the shell 19 that is equipped with apertures 40 and latch fingers 42 for the output connector 18.

Figure 4:
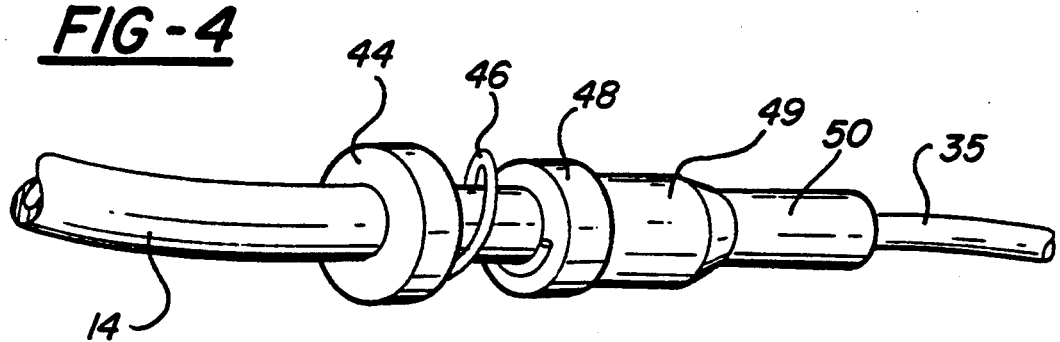
FIG. 4 is a perspective view of a component for the fiber optic connector that is shown in FIG. 1.
Figure 5:
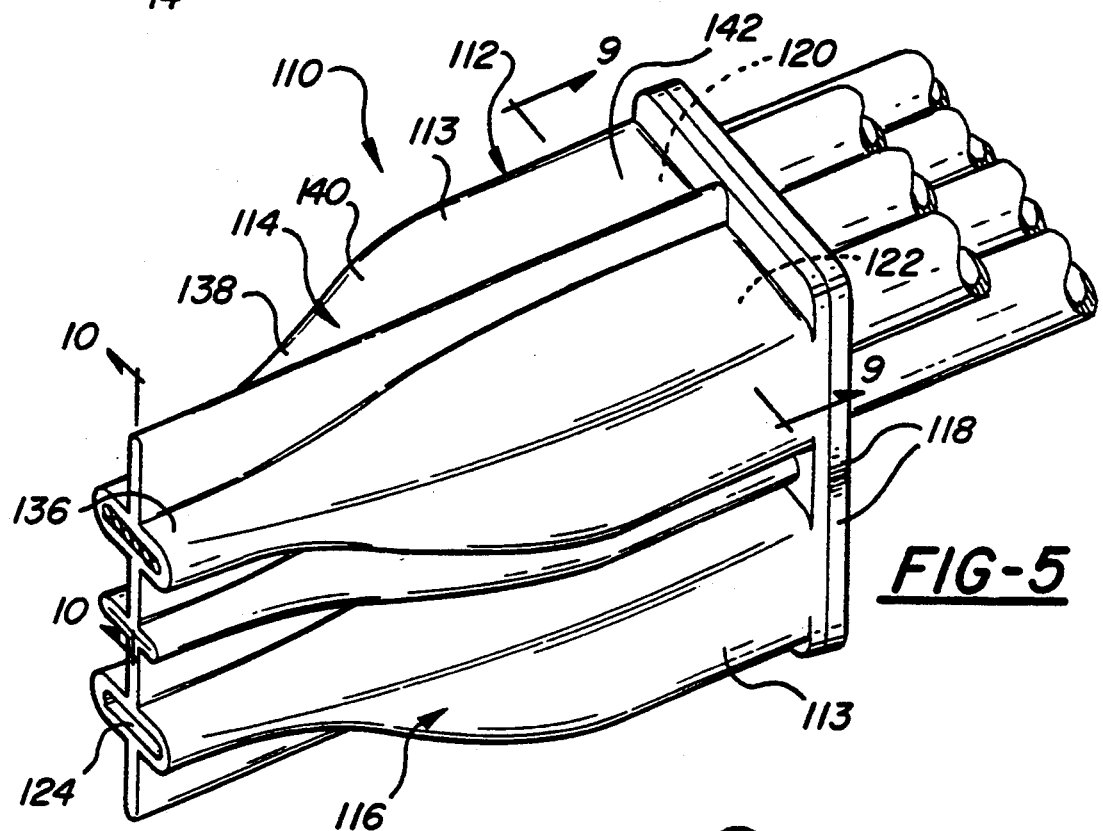
FIG. 5 is a perspective view of a second embodiment of a fiber optic connector in accordance with the invention.

FIG. 4 illustrates the preparation of a typical jacketed optic fiber 14 for use in the fiber optic connector 10. The end of the jacketed optic fiber 14 is threaded through a slip washer 44, a coil compression spring 46 and a metal ferrule 48. The metal ferrule 48 is then attached to the jacketed optic fiber 14 by an integral crimp sleeve 49 in a conventional manner. The jacket 50 is then stripped from an end portion of the optic fiber 14 to expose the core end 35.

The prepared optic fibers 14 are then assembled to the fiber optic connector 10 individually. The stripped core end 35 of each optic fiber 14 is inserted into one of the grooves 24 or 28 through one of the apertures 40 in the back wall of the shell 19. The optic fiber 14 is pushed forward until the slip ring 44 is snapped past the lugs of the latch fingers 42 to hold it in place whereupon the optic fiber 14 is pushed forward under the action of the coil compression spring 46. The inner wedge member 36 holds the optic fiber 14 in the rear portion of the groove and guides the stripped core end 35 into the transition portion of the groove as the optic fiber 14 is being pushed forward. The stripped core end 35 is held in and guided through the transition portion of the groove and into the slot 34 by the front block portion of the complimentary part 20 or 22. The stripped core end 35 is then guided into its proper place in the abutting linear array by a ramp 25 or 29 in the rear portion of one of the partial slots 26 or 30.

Once all the optic fibers 14 are assembled into the fiber optic connector 10, it may be plugged onto a suitably configured mating connector of an optical device, such as the ribbon holder 40 of the star coupler disclosed in U.S. Pat. No. 4,995,692 discussed above. To this end, the fiber optic connector 10 may include a pin and hole arrangement complimentary to that of the ribbon holder 40 or other suitable latching arrangements may be used. Alternately, the connector 10 could be configured to be connected and latched to a star coupler like that shown in FIGS. 14, 15 and 23 of the instant application and described hereafter.

Referring now to FIGS. 5 through 10, a second embodiment of a fiber optic connector 110 of this invention is disclosed.

The fiber optic connector 110 comprises a one piece common outer member 112 for input and output connectors 114 and 116, each of which has its own inner wedge member 118.

Figure 6:
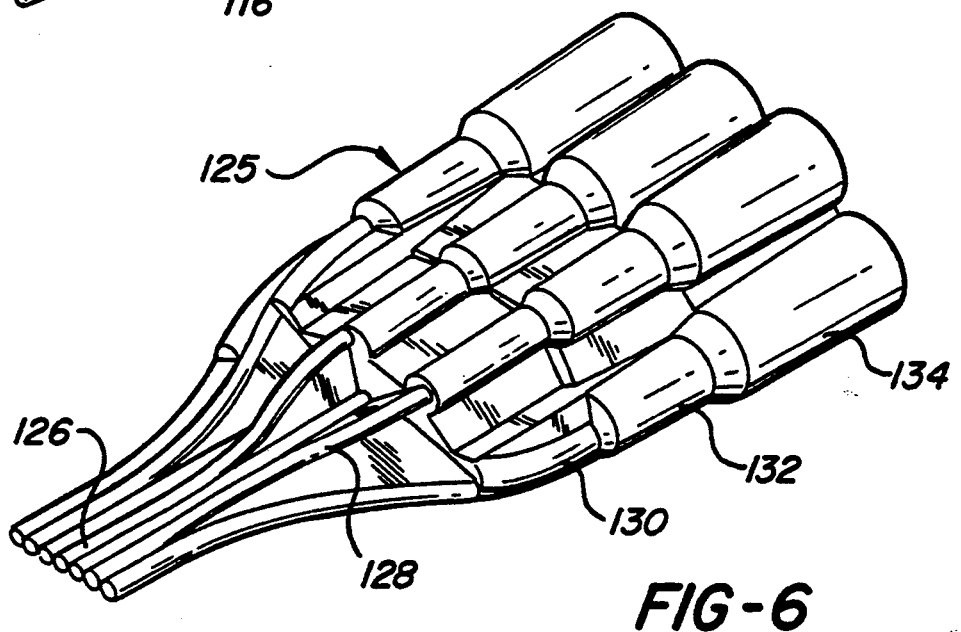
FIG. 6 is a perspective view of a mold insert for making a component of the second embodiment that is shown in FIG. 5.

The outer member 112 has identical housing portions 113 for the respective input and output connectors 114. Each housing portion 113 has a cavity 120 in its rear end, that has seven grooves 122. The cavity 120 and the seven grooves 122 converge into a single slot 124 at the front end of the housing section 113. The cavity 120, grooves 122 and slot 124 are formed by a mold insert 125 that is shown in FIGS. 6 and 7.

The mold insert 125 may be described as having five sections arranged end to end. These are a slot forming section 126; a first converging groove forming section 128 for stripped cores, a second converging groove forming section 130 for jacketed optic fibers, a first parallel groove forming section 132 for jacketed optic fibers and a second parallel groove forming section 134 for jacketed optic fibers having attached ferrules.

The mold insert 125 forms the slot 124 as well as the cavity 120 and the seven grooves 122 that converge into the slot 124. More specifically the mold section 126 forms the slot 124 in the front section 136 of the housing portion 113. The mold section 128 starts the cavity 120 and forms seven converging core groove portions in the housing section 138. The mold section 130 continues and enlarges the cavity 120 and forms seven converging fiber optic groove portions in the housing section 140 that continue the seven converging core groove portions in the housing section 138. The mold section 132 continues and further enlarges the cavity 120 and forms seven parallel fiber optic groove portions in the front of the housing section 142 that continue the seven converging fiber optic groove portions in the housing section 140. And finally the mold section 134 continues and further enlarges the cavity 120 and forms seven parallel ferrule groove portions in the rear of the housing section 142 that continue the seven parallel fiber optic groove portions in the front of section 142.

The slot 124 that is formed in the housing portion 113 for the input connector 114 has a constant depth substantially equal to the diameter of the stripped cores of the optic fibers 14.

The seven grooves 122 that are formed in the housing portion 113 by the mold insert 125 are arranged in two rows that are on opposite sides of the cavity 120 that is formed by the mold insert 125 as best demonstrated by FIG. 7 and shown in FIGS. 9 and 10. The upper row has three grooves 122 and the lower row has four grooves 122. Each of the grooves 122 in the upper row is laterally offset from the grooves 122 in the lower row and visa-versa so that the converging grooves 122 and merge into the slot 124 in an interdigitated relationship.

The input connector 114 further comprises an inner wedge member 118 that comprises a grooved portion 144 that is attached to a back plate 146. The grooved portion 144 has seven grooves that complement the seven grooves 122 of the housing portion 113 so as to guide the optic fibers 14 into the slot 124 when the optic fibers 14 are inserted into the back end of the housing portion 113.

The grooved portion 144 may be described as having four sections arranged end to end. These are a converging core groove section 148, a converging jacketed fiber optic groove section 150, a parallel jacketed fiber optic groove section 152 and a parallel ferrule groove section 154. The converging core groove section 148 cooperates with the housing section 138 to hold stripped cores in the converging core groove portions in that section. The converging jacket fiber optic groove section 150 cooperates with the housing section 140 to hold jacketed optic fibers in the converging jacketed optic fiber groove portions in housing section 140. And finally the parallel jacketed fiber optic groove section 152 and the parallel ferrule groove section 154 cooperate with the housing section 142 to hold the jacketed optic fibers in the parallel groove portions in the housing section 142.

The grooved portion 144 fits into the cavity 120 in the rear portion of the housing portion 113 with its grooves complementing those of the housing portion 113 so that the grooved portion 144 guides and holds individual jacketed optic fibers 14 that are pushed into the respective grooves 122 in the housing portion 113. The grooved portion 144 is integrally attached to a back plate 146 that has a plurality of apertures 156 that are aligned with the respective grooves 122. The back plate 146 may also include a pair of resilient latch fingers (not shown) associated with each aperture 156 to retain the optic fibers 14 in the input connector 114 individually so that each optic fiber 14 is assembled independently and can be serviced or replaced without disturbing the others.

The output connector 116 is identical to the input connector 114. It comprises the lower housing portion 113 of the outer member 112 and an identical inner wedge member 118.

The typical jacketed optic fiber 14 shown in FIG. 4 and described above for use in the fiber optic connector 10 may be used in the fiber optic connector 110 also. In this case, the stripped core end 35 of each optic fiber 14 is inserted into one of the grooves 122 through one of the apertures 156 in the back plate 146. The optic fiber 14 is pushed forward until the slip ring 44 is snapped past the lugs of the latch fingers (not shown) to hold it in place whereupon the optic fiber 14 is pushed forward under the action of the coil compression spring 46. The inner wedge portion 144 of the inner member 118 holds the optic fiber 14 in the groove 122 and guides the stripped core end 35 into its proper place in the abutting linear array of stripped core ends 35 in the slot 124.

Once all the optic fibers 14 are assembled into the fiber optic connector 110, it may be plugged onto a suitably configured mating connector of an optical device such as the ribbon holder 40 of the star coupler disclosed in U.S. Pat. No. 4,995,692 that is discussed above. To this end, the fiber optic connector 110 may also include a pin and hole arrangement complimentary to that of the ribbon holder 40 or other suitable latching arrangements may be used. Alternately, the connector 110 could be configured to be connected and latched to a star coupler like that shown in FIGS. 14, 15 and 23 of the instant application and described hereafter.

Figure 22:
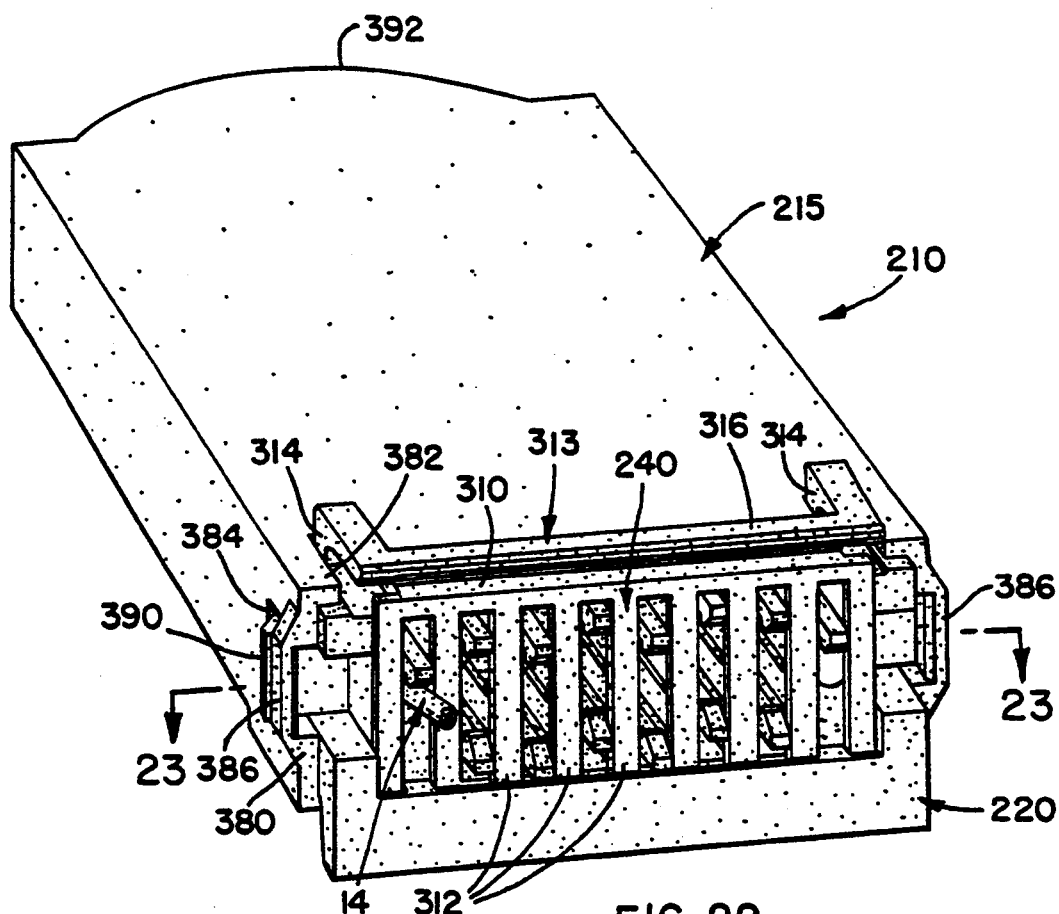
FIG. 22 is a perspective view of the fiber optic star and transmission line assembly of FIG. 11, but showing all the parts connected together as a final assembly except for the optical fibers.
Figure 23:
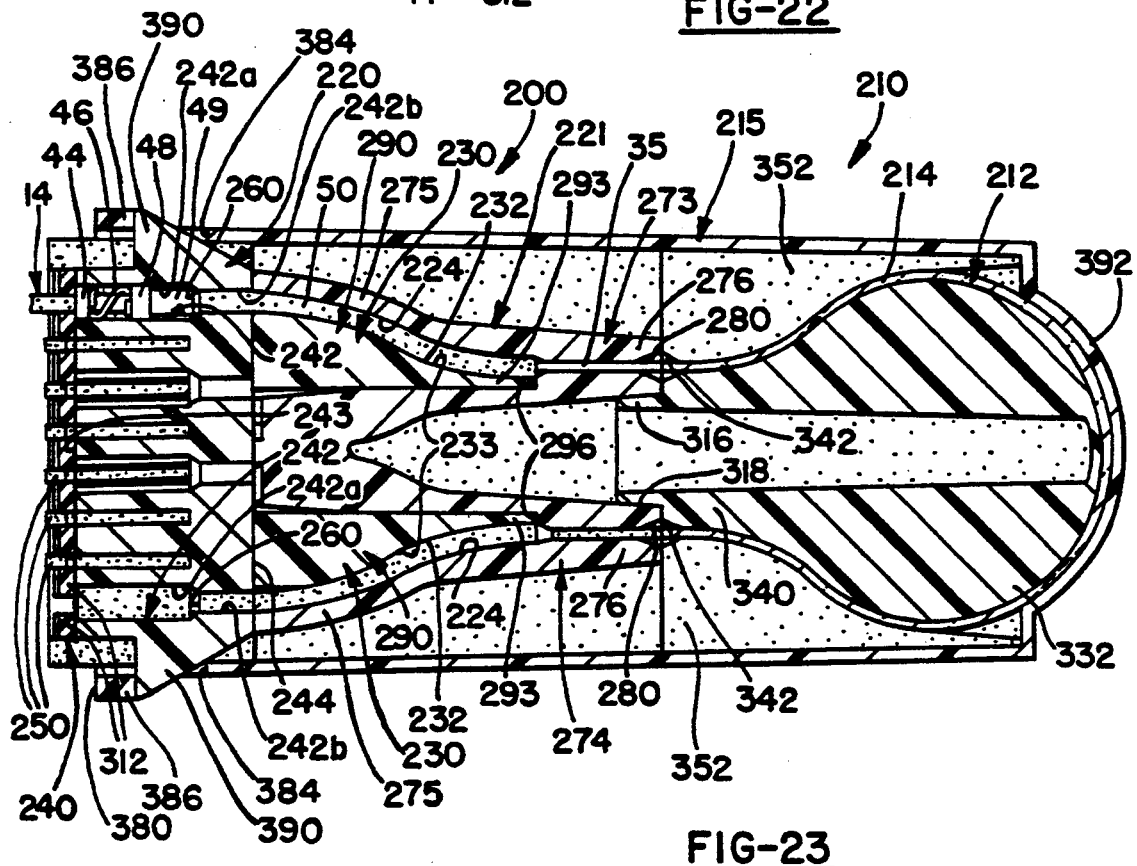
FIG. 23 is a cross sectional view of the assembly shown in FIG. 22 and looking in the direction of the arrows 23—23 of FIG. 22 and then rotated clockwise 90°.

Referring now to FIGS. 11–23, a third embodiment of a fiber optic connector or connector means 200 of this invention is disclosed for use as part of a fiber optic star and transmission line assembly 210, as best shown in FIGS. 11, 22 and 23. The fiber optic star and transmission line assembly 210 comprises, in general, the multi-part fiber optic connector means 200 for housing and positioning multiple jacketed input and output optic fibers 14 such that their forward or exposed ends are aligned in linear vertical rows, a fiber optic ribbon retainer housing 212 for retaining a fiber optic ribbon 214 (see FIG. 23) and with the opposite ends of the ribbon 214 being respectively aligned with the input and output linear rows of optic fibers of the connector means 200, and a cover 215 for receiving both the fiber optic connector means 200 and the ribbon retainer housing 212 and which lockingly engages a female connector 220 of the fiber optic connector means 200 to form the assembly 210. The fiber optic connector means 200 is a multi-part connector and includes the female connector 220 for receiving the jacketed optic fibers 14, a convergence connector or housing 221 having a pair of large central openings 222 (see FIGS. 16–18) provided with semi-circular grooves 224 and a pair of wedges or stuffers 230 which are positioned in the openings 222 and which have semi-circular grooves 232 which match up or align with the grooves 224 in the convergence connector 221 housing to provide a plurality of discrete passageways 233 for the jacketed optic fibers 14, as best shown in FIG. 23. In addition, the fiber optic connector means 200 includes a fiber or terminal position assurance device 240 to ensure that all the optic fibers 14 are properly positioned within the fiber optic female connector 200.

As best shown in FIGS. 11 and 12, the female connector 220 comprises a one piece generally rectangularly shaped, plastic housing or body having a plurality of apertures 242 extending therethrough from its back side 243 to its front side 244. As best shown in FIG. 23, the apertures 242 have a first diameter portion 242a along a rearward portion of the connector body 220 and a lesser diameter portion 242b along the forward portion of the connector body 220 and for reasons to be hereinafter more fully explained. As shown in FIG. 12, there are fourteen through openings 242, two side end openings 242 and twelve openings arranged in two rows, an upper row and a lower row. The apertures 242 along their large diameter portions 242a at their adjacent sides in the two rows are in communication with each other via slots 246. The connector body 220 also has slots 248 extending through its top and bottom sides 220a, 220b and with the slots 248 being in communication with one of the through openings 242 either at its upper end or its lower end, as viewed in FIG. 12. Integral with the connector body 220 and disposed within the slots 248 are deflectable latch fingers 250 which are supported in cantilever fashion and are integral with the connector body at the junction of its forward and rearward portions. The latch fingers 250 lie in the slots 248 and have a barb 252 at their free ends.

The connector body 220 serves to hold or retain the individual optic fibers 14 in place within the body 220. The optic fibers 14 are insertable into the openings 242 from the back side 243 of the connector body 220. The stripped core end 35 and the jacketed portion 50 of the optic fibers 14 are passed through the connector body 220. When an optic fiber 14 is pushed through the opening 242, the crimp barrel 49 of the terminal 48 will engage the adjacently located barb 252 of the finger 250 and cause the latter to be cammed outwardly of the connector body 220 until the terminal 48 and the slip ring 44 are located within the opening portion 242a of the aperture 242. When the slip ring 44 is pushed past the deflectable finger 250, the deflectable finger 250 will return towards its normal free state position and its barb 252 will hook or latch behind the slip washer 44. When this occurs, the coil spring 46 will bias the terminal 48 into engagement with a surface 260 at the juncture of the opening portions 242a and 242b and the slip ring 44 into engagement with the barb 252 of the latch finger 250, as best shown in FIG. 23. The jacketed portion 50, and the stripped end 35 of the optic fiber 14 will extend through the opening portion 242b and rearwardly or outwardly from the front wall 243 of the connector body 220. This step or procedure is repeated for all fourteen of the optic fibers 14 to be connected to the connector body 220. The connector body 220 thus serves to position and hold each of the optic fibers 14 in place.

Figure 17:
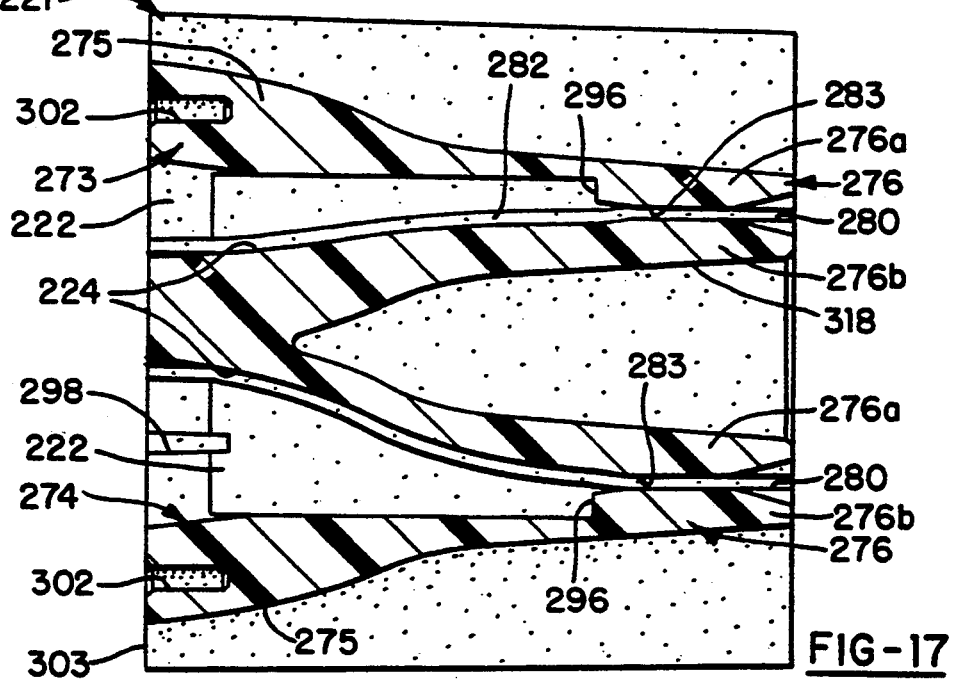
FIG. 17 is an enlarged sectional view of the convergent connector housing of FIG. 16 taken along the lines 17—17 of FIG. 16 and then rotated clockwise 90°.
Figure 18:
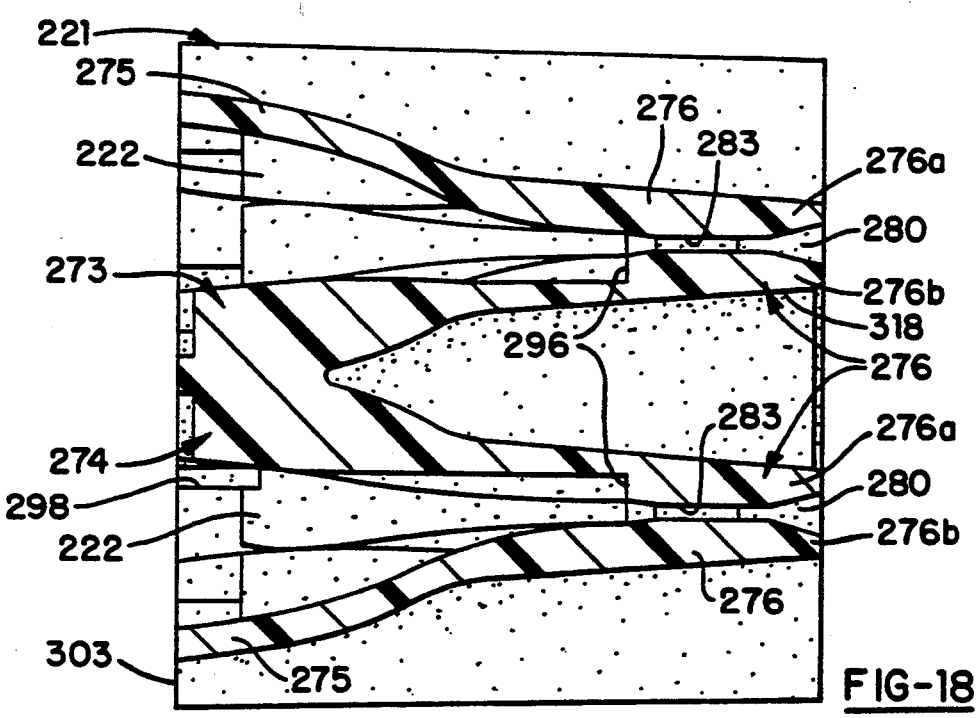
FIG. 18 is an enlarged cross sectional view like that shown in FIG. 17 but taken along lines 18—18 of FIG. 16.
Figure 19:
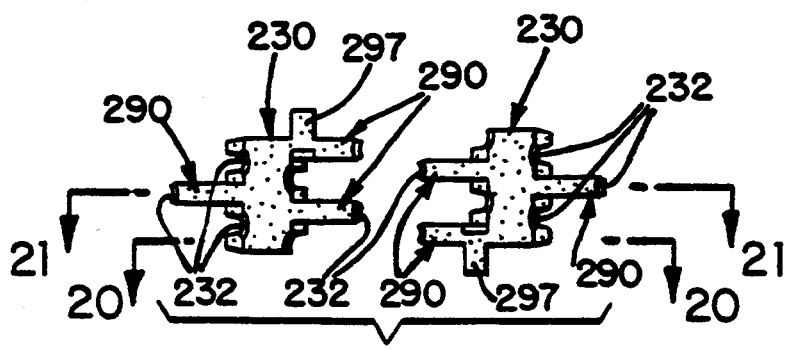
FIG. 19 is an end elevational view of a pair of wedges or stuffers for use with the convergence connector and looking in the direction of the arrows 19—19 of FIG. 11.
Figure 20:
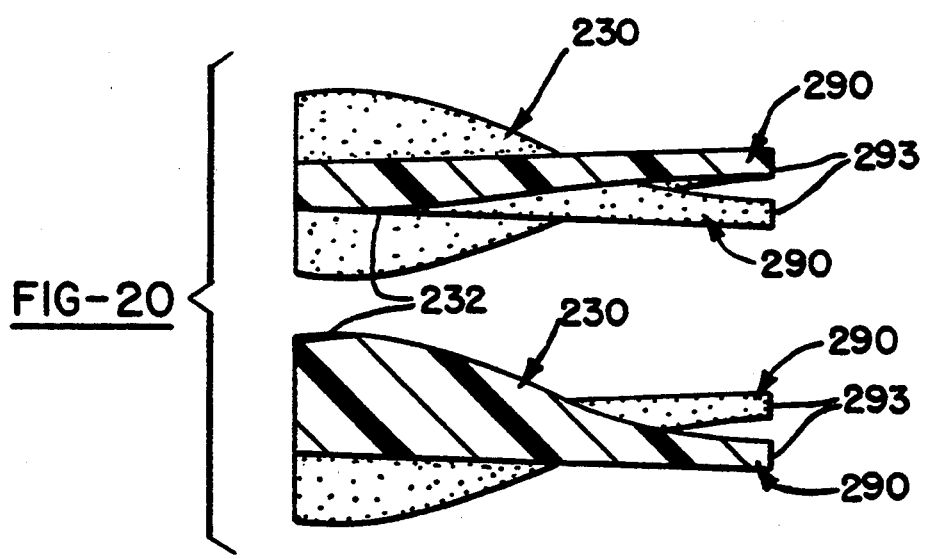
FIG. 20 is an enlarged cross sectional view of wedges shown in FIG. 19 taken along the lines 20—20 of FIG. 19 and then rotated clockwise 90°.
Figure 21:
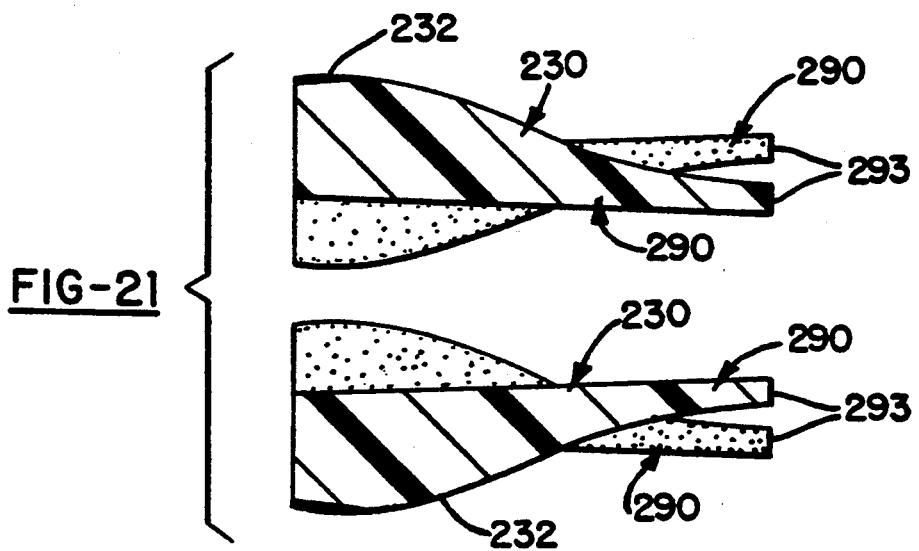
FIG. 21 is a view like that shown in FIG. 20 but taken along lines 21—21 of FIG. 19.

The female connector body 220 is adapted to be connected to the convergence connector 221. The convergence connector 221, as best shown in FIGS. 11, 16–18 and 23, comprises a generally rectangular one piece plastic housing having a flat or planar top side 270, a planar bottom side 272 and intermediate housing portions 273 and 274 integral therewith and extending between top and bottom sides 270, 272. As best shown in FIGS. 17, 18 and 23, the housing portions 273, 274 have a rearward end section 275 and a forward end section 276 and are integral with each other at their rearward ends. The rearward end sections 275 have irregularly shaped openings 222 therethrough and the forward sections 276 comprise pairs of horizontally spaced vertically extending walls 276a, 276b which define vertically extending slots 280 therebetween. Each slot 280 is open at the forward end of the convergence connector 221, as shown in FIGS. 17 and 11.

Figure 16:
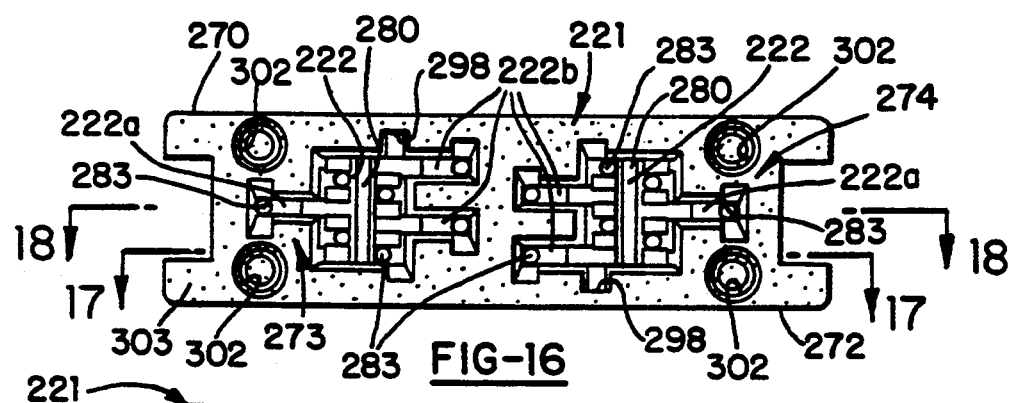
FIG. 16 is an end elevational view of a convergent connector housing forming part of the fiber optic connector and looking in the direction of the arrows 16—16 of FIG. 11.

Each of the openings or cavities 222 in the rearward section 275 of the housings 273, 274 is generally rectangularly shaped at its middle, as best shown in FIG. 16, and includes both leftward horizontal and rightward horizontal extending slots 222a and 222b, respectively, in communication with the middle rectangular opening. The central cavities 222 at different locations are in communication with semi-circular grooves 224 formed in the housing end section 275 and with the semi-circular grooves 224 terminating into round openings 283 in the forward end section 276 which is in communication with the slot 280. The diameter of the semi-circular grooves 224 is equal to or slightly larger than the diameter of the jacket 50 of the optic fibers 14. The central cavities 222, the openings 283 and the slot 280 would be formed during the injection molding operation for making the convergence connectors 221 by having suitably shaped cores (not shown) corresponding to the shapes of these cavities and openings. Thus, the mold core to produce the large cavity 222 would have a shape corresponding to the shape of the openings as shown in FIGS. 16, 17 and 18. The openings 283 adjacent the cavities 222 have a diameter equal or slightly larger than the diameter of the stripped end 35 of the optic fibers 14.

The optical connector 200 also includes a pair of wedges or stuffers 230 which are adapted to be received within the cavities 222 of the convergence connector 221. The wedges 230, as best shown in FIGS. 11, 19–21 and 23, are shaped generally complementary to the cavity 222. The wedges 230 are made of a one piece plastic construction and include seven longitudinally extending members 290 which are vertically spaced from each other and in which four are located at one side and three are located in the other side. Each of the members 290 of the wedge 230 at their outer side surface define generally a semi-circular grooved 232 for guiding the individual optic fibers 14. As can be seen from FIGS. 16 and 19, the wedges 230 as viewed in end elevation, are shaped like the cavities 222 in the housing portions 273, 274, as shown in FIG. 16. The wedges 230 are adapted to be inserted into the cavities 222 of the converges connector 221 and with the forward ends 293 of the members 290 abuttingly engaging surfaces 296 at the juncture of forward and rearward sections 276, 275, respectively, of the housing portions 273, 274.

To ensure that the wedge members 230 cannot be wrongly inserted, they are provided with a transversely extending lugs 297 which are adapted to be slidably received in complementary recesses 298 in the housing portions 273, 274 of the convergence connector 221, the recesses 298 being in communication with the central cavity 222. When the wedges 230 are slidably positioned within the cavities 222 of the convergence connector 221, the outer side grooves 232 of the members 290 are located adjacent the grooves 224 in the rearward sections 275 of the housing portions 273,274, and define therewith a circular path 233 through which the jacketed portion 50 of the optic fibers 14 can be passed, as best shown in FIG. 23.

When the wedges 230 are connected to the convergence connector 221, the stripped ends 35 of the jacketed optic fibers 14 can be inserted through the passageways 233 defined between the outer side grooves 232 of the members 290 of the wedge 230 and the grooves 224 in the housing portions 273, 274 and with the jacketed fibers 14 being guided thereby. When the optic fibers 14 have been inserted in the passageways 232, the connector 220 can be moved forwardly and connected to the convergence connector 221. When this occurs, the stripped ends 35 of the fibers 14 will be moved through the openings 283 in the forward section 276 of the housing portions 273, 274 and will automatically be vertically aligned in the end slot 280 like that shown in connection with the connector 10 of the FIG. 1 embodiment. To connect the two connectors 220, 221, the female connector 220 has four pins 300 projecting from its front side 244 which are adapted to be received within aligned apertures 302 on the rear side 303 of the convergence connector 221. This positions the female connector 220 relative to the convergence connector 221.

To ensure that each of the optic fibers 14 is properly positioned within the female connector body 220, a terminal or optic fiber position assurance member 240 is provided. The member 240 is generally L-shaped and comprises a horizontally extending deflectable headed latch 310 and a plurality of downwardly or vertically extending tines 312, as viewed in FIGS. 11 and 22. The tines 312 are spaced from each other a distance such that they will pass through the slots 248 in the top 220a of the connector body 220. The connector body 220 has an upwardly extending catch 313 comprising pair of L-shaped leg portions 314 integral with the top side 220a and a transversely extending portion 316 integral with the free ends of the leg portions 314. The catch 313 is deflectable as is the latch 310. The position assurance member 240 is first positioned so that the optic fibers 14 are received between the tines 312 and then the position assurance member 240 is moved forwardly and with the headed latch member 310 engaging the transverse cross portion 316 of the catch 313 and with the two deflecting away from each other until the headed latch 310 passes the catch 313 and is latched therebehind. The tines 312 will extend between the fingers 250 and partially cover the openings 242 in the connector body 220 to ensure that the slip washer 44 and terminal 48 cannot be pulled rearwardly out from the connector body 220 without first removing the position assurance member 240.

Figure 13:
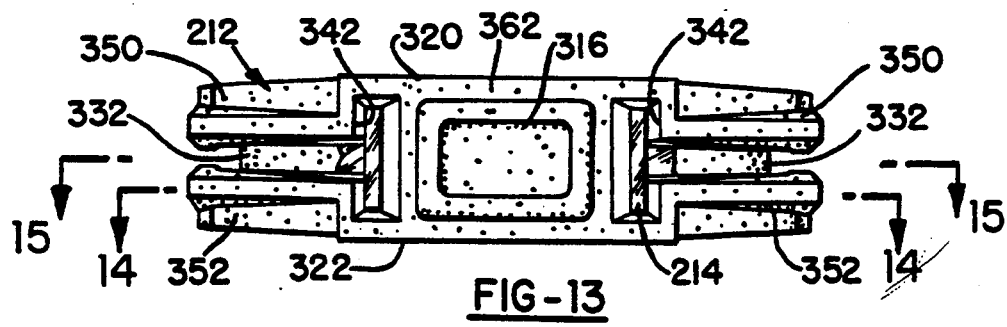
FIG. 13 is a front or end elevational view of a retainer housing for a curved optical ribbon and looking in the direction of the arrows 13—13 of FIG. 11.
Figure 14:
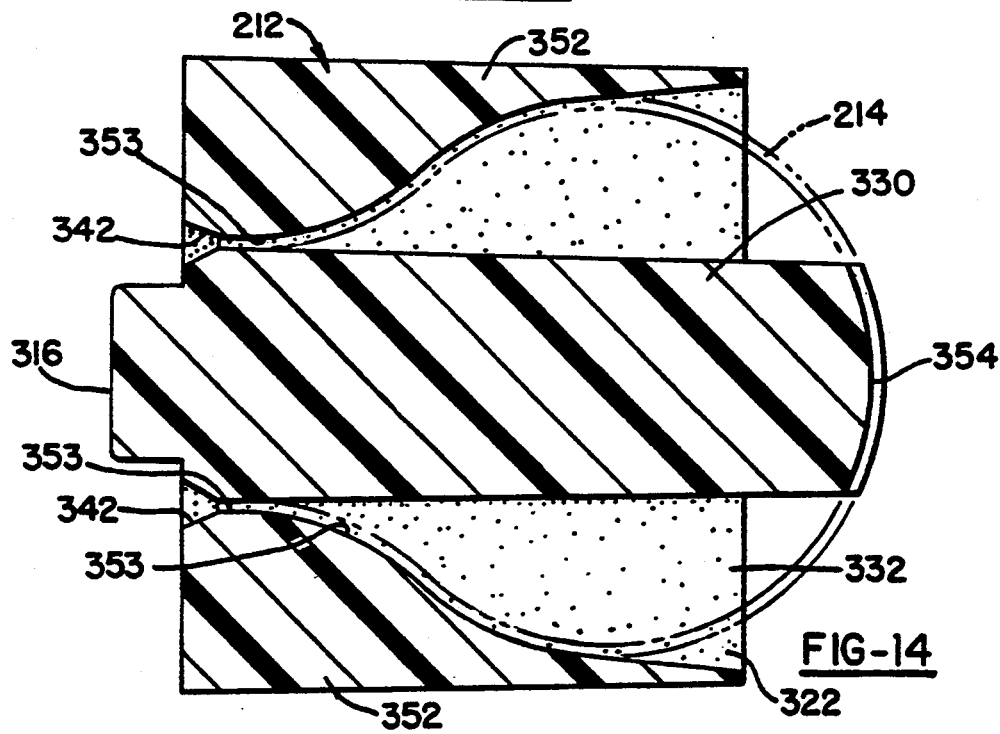
FIG. 14 is an enlarged cross sectional view of the ribbon retainer housing of FIG. 13 taken along the lines 14—14 of FIG. 13 and then rotated clockwise 90°.
Figure 15:
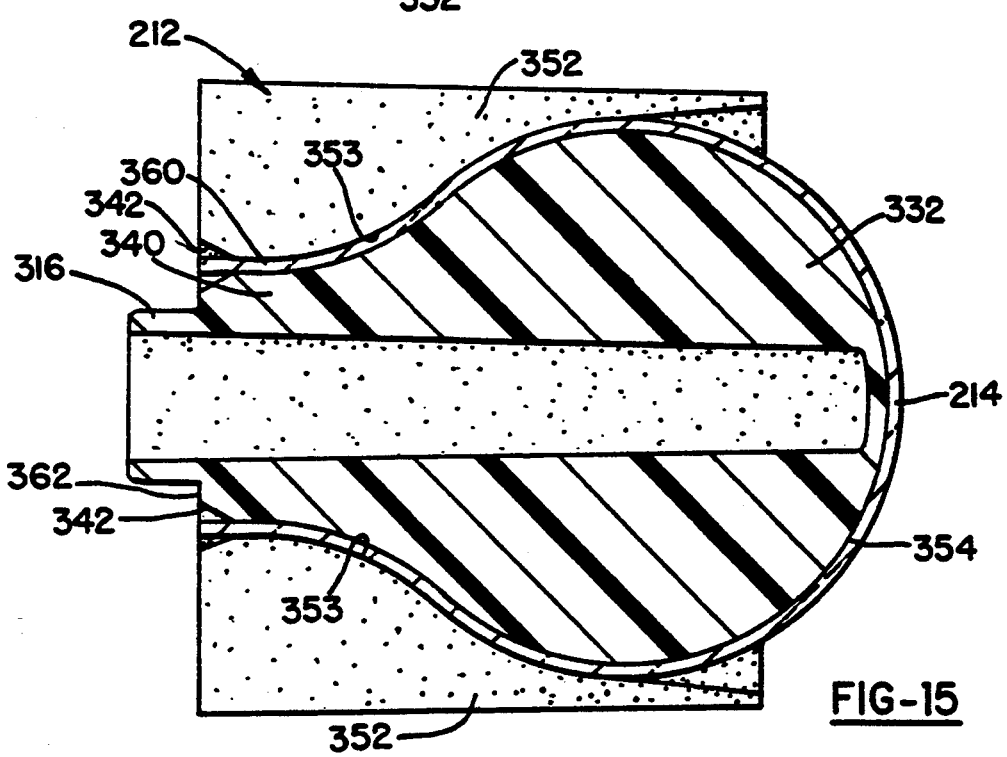
FIG. 15 is a view like that shown in FIG. 14 but taken along the lines 15—15 of FIG. 13.

The convergence connector 221 at its forward end is adapted to be abuttingly engaged with the rearward end of the ribbon retainer housing 212. The ribbon retainer housing 212, as best shown in FIGS. 13–15 comprises a generally rectangularly shaped, one piece, plastic housing having a planar top and a planar bottom 320, 322. The retainer housing 212 has a projecting rectangular forward portion 316 which is adapted to be slidably received in a rectangular opening 318 in the convergence connector 221 to slidably connect the retainer housing 212 to the convergence connector 221. The retainer housing 212 includes a solid central portion 330 extending between the top and bottom sides 320, 322. The central portion 330 has an integral circular disk portion 332 intermediate its upper and lower ends which tapers or necks down at 340 to partially define slots 342 extending vertically of the retainer housing 212, as best shown in FIG. 13. The retainer housing 212 also includes upper and lower side wall portions 350, 352 overlying the disk portion 332 and whose inner vertical wall surfaces 353 are curved and contoured to follow the outline of the desk portion 332. The wall surfaces 353 are spaced from the outer surface of the disk portion 332 so that its rearward end is located adjacent the neck down portion 340 of the disk portion 332 to define the slots 342. The core 330 at its forward end 354 is solid from the top to the bottom of the retainer housing 212 and is provided with a rounded outer surface. The retainer housing 212 houses and retains a fiber optic ribbon 214, as shown in FIG. 15. The ribbon 214 is flexible and can be curved and trained around the disk portion 332 and have its opposite ends secured in the slots 342. The ribbon 214 serves as a star mixer and is positioned flush with the rear face 362 of the retainer housing 212 and has its ends polished. The ends of the ribbon 214 and the ends of the optic fibers 14 are aligned and abut when the connector parts are joined, as best shown in FIG. 23. When the parts are assembled, as described above, and the connector 220 joined to the retainer housing 212, efficient coupling occurs between the optic fibers 14 in the convergence connector housing 221 and the ribbon 215 in the retainer housing 212.

The fiber optic ribbon could be made of any suitable or conventional flat ribbon material. Suffice it to say that the fiber optic ribbon could be made in accordance with and be like that disclosed in the afore-mentioned U.S. Pat. No. 4,995,692, which is incorporated herein by reference.

The fiber optic connector body 220, the convergence connector 221 and the ribbon retainer housing 212 are all held connected to one another by the cover 215. The cover 215 comprises a rectangularly shaped, hollow, plastic housing having an open side 380. The cover includes a pair of spaced slots 382 in its top side for slidably receiving the legs 314 of the catch 313. The cover also has a pair of openings 384 at its opposite lateral sides and an integral catch or bridge 386 at the forward ends of the sides. The cover is connected to the total assembly 212 by sliding the same over the ribbon housing 212, convergence housing 221 and the female connector body 220. As the cover is slid over the female connector body 220, the leg portions 314 will be received within the slots 382 and the bridge 386 will engage tapered latches 390 at the sides of the connector body 220 which causes the cover 215 to be deflected or bowed outwardly at its sides. This outward bowing occurs until the bridge members 386 clear the latches 390 whereupon the inherent resilience of the cover 215 will cause the bridge members 386 to lock behind the latches 290 and with the latches 390 being received in the openings 384, as best shown in FIGS. 23, 22. It should be noted that the cover 215 at its forward end 392 has a shape complementary to the shape of the end 354 of the ribbon retainer housing 212 and thus, provides a cover for the ribbon 214 being trained around the surface 354.

From the foregoing, it should be apparent that the FIGS. 11–23 embodiment provides a novel compact fiber optic star and transmission line assembly 210 in which all the parts can be readily connected together and retained in a single cover or box for easy portability.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A fiber optic star and transmission assembly for transmitting optical signals from a plurality of input optic fibers to a plurality of output optic fibers comprising:

a female connector body having a plurality of openings therethrough for retaining and positioning a plurality of input and output optic fibers therein and with the fibers having jacketed and stripped end portions projecting forwardly of the connector body, a convergence connector body having a pair of central cavities at its rearward portion and vertically extending linear slots at its forward end, the cavities each including semi-circular grooves at different spaced locations in communication therewith and which are in communication with the linear slots, wedge means shaped complementary with the cavities in said convergence connector body and having semi-circular recesses adjacent the semi-circular grooves in the body when the wedge means is inserted into the cavity to define passageways, said optic fibers being insertable through said passageways defined by the grooves and semi-circular recesses in the wedge means, said passageways guiding the jacketed and stripped ends of the optic fibers into the linear slot at the forward end of the convergence connector so that the optic fiber end faces are linearly arrayed, said female connector being slidably connectable to said convergence connector and abuttingly engaging the convergence connector to retain the wedge means in place when connected thereto, a ribbon retainer housing for housing a fiber optic ribbon whose ends are linear and are aligned with the stripped ends of the input and output optic fibers, means slidably connecting the ribbon retainer housing to the convergence housing so that the ends of the ribbon and the linearly arrayed input and output optic fibers are in abutting engagement, a hollow cover means for receiving the ribbon housing, convergence connector housing and the female connector, said cover means and the female connector having cooperating means for latching the cover to the female connector to maintain all of these parts connected together.

2. A fiber optic star and transmission assembly, as defined in claim 1, and including a fiber optic terminal position assurance member operatively connected with the female connector body to ensure that all of the optic fibers are properly connected to and retained within the female connector body.

3. In a fiber optic star and transmission assembly, as defined in claim 2, and wherein the female connector body and the terminal position assurance member have cooperable means for latching the terminal position assurance member in place on the connector body and wherein the terminal position assurance member includes a plurality of spaced tines which partially overlie the openings in the female connector body.

* * * * *